(12) United States Patent
Lu

(10) Patent No.: US 8,930,171 B2
(45) Date of Patent: Jan. 6, 2015

(54) METHOD OF MODELING SPATIAL CORRELATIONS AMONG INTEGRATED CIRCUITS WITH RANDOMLY GENERATED SPATIAL FREQUENCIES

(75) Inventor: Ning Lu, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 13/343,753

(22) Filed: Jan. 5, 2012

(65) Prior Publication Data

US 2013/0179127 A1    Jul. 11, 2013

(51) Int. Cl.
*G06F 17/50*    (2006.01)

(52) U.S. Cl.
CPC .................. *G06F 17/5072* (2013.01)
USPC ........................................................ 703/2

(58) Field of Classification Search
CPC .................. G06F 17/5072; G06F 17/5009
USPC ........................................................ 703/2
See application file for complete search history.

(56) References Cited

U.S. PATENT DOCUMENTS

| 6,662,185 | B1 | 12/2003 | Stark et al. |
| 7,082,204 | B2 | 7/2006 | Gustavsson |
| 7,212,946 | B1 | 5/2007 | Venkateswa |
| 7,676,775 | B2 | 3/2010 | Chen et al. |
| 7,707,526 | B2 | 4/2010 | Su et al. |
| 7,844,418 | B2 | 11/2010 | Hemmett et al. |
| 7,848,907 | B2* | 12/2010 | Lu ..................... 703/2 |
| 7,945,887 | B2 | 5/2011 | Lu |
| 7,992,114 | B1 | 8/2011 | Adams et al. |
| 2008/0059143 | A1* | 3/2008 | Chiu et al. ....................... 703/14 |
| 2011/0041115 | A1 | 2/2011 | Potkonjak |

OTHER PUBLICATIONS

Lu, Ning, "Modeling of Mismatch and Across-Chip Variations in Compact Device Models", NSTI-Nanotech 2010, vol. 2, 2010.
IBM, "Method of Modeling a Translational- Invariant and Continuous Spatial Correlations" IPCOM000190067D, Nov. 16, 2009, ip.com.
Pelgrom, et al., "Matching Properties of MOS Transistors", IEEE Journal of Solid-State Circuits, vol. 24, No. 5, Oct. 1989.

* cited by examiner

*Primary Examiner* — Dwin M Craig
(74) *Attorney, Agent, or Firm* — David A. Cain; Hoffman Warnick LLC

(57) ABSTRACT

A computer-implemented method, computer system, and computer program for modeling spatial correlations among a set of devices. A method includes: assigning a set of physical coordinates to each device in the set of devices; representing one of a process parameter or an electric parameter for each device as a sum of at least two stochastic terms, wherein the at least two stochastic terms are chosen to satisfy the spatial correlations; simulating formation of the set of devices using the physical coordinates and the at least one of the process parameter or the electric parameter; and obtaining statistical properties of the set of devices from the simulation.

20 Claims, 5 Drawing Sheets

METHOD OF MODELING SPATIAL CORRELATIONS AMONG INTEGRATED CIRCUITS WITH RANDOMLY GENERATED SPATIAL FREQUENCIES

FIELD OF THE INVENTION

Aspects disclosed herein relate to modeling integrated circuit devices. More specifically, aspects disclosed herein relate to modeling spatial correlations among a set of semiconductor devices, a set of logic gates, or a set of integrated circuit devices using randomly generated spatial frequencies.

As integrated circuit (IC) process technology moves to progressively smaller technology nodes (e.g., down to 45 nanometer (nm), 32/28 nm, and 22/20 nm node technologies), variations in these processes become larger and larger. In semiconductor processes and devices, as well as in logic circuits, the intra-die variations and/or inter-die variations exhibit spatial correlations. These correlations can be difficult to model, particularly as the IC process technology progresses to smaller nodes.

BRIEF DESCRIPTION

An approach for modeling spatial correlations among integrated circuits is disclosed. In one embodiment, a computer-implemented method of modeling spatial correlations among a set of devices is disclosed. The method includes: assigning a set of physical coordinates to each device in the set of devices; representing one of a process parameter or an electric parameter for each device as a sum of at least two stochastic terms, wherein the at least two stochastic terms are chosen to satisfy the spatial correlations; simulating formation of the set of devices using the physical coordinates and the at least one of the process parameter or the electric parameter; and obtaining statistical properties of the set of devices from the simulation.

A first aspect includes a computer-implemented method of modeling spatial correlations among a set of devices, the method including: assigning a set of physical coordinates to each device in the set of devices; representing one of a process parameter or an electric parameter for each device as a sum of at least two stochastic terms, wherein the at least two stochastic terms are chosen to satisfy the spatial correlations; simulating formation of the set of devices using the physical coordinates and the at least one of the process parameter or the electric parameter; and obtaining statistical properties of the set of devices from the simulation.

A second aspect includes a system having: at least one computing device configured to model a spatial correlation among a set of devices by performing the following: assigning a set of physical coordinates to each device in the set of devices; representing one of a process parameter or an electric parameter for each device as a sum of at least two stochastic terms, wherein the at least two stochastic terms are chosen to satisfy the spatial correlations; simulating formation of the set of devices using the physical coordinates and the at least one of the process parameter or the electric parameter; and obtaining statistical properties of the set of devices from the simulation.

A third aspect includes a computer program comprising program code embodied in at least one computer-readable storage medium, which when executed, enables a computer system to model a spatial correlation among a set of devices, the method including: assigning a set of physical coordinates to each device in the set of devices; representing one of a process parameter or an electric parameter for each device as a sum of at least two stochastic terms, wherein the at least two stochastic terms are chosen to satisfy the spatial correlations; simulating formation of the set of devices using the physical coordinates and the at least one of the process parameter or the electric parameter; and obtaining statistical properties of the set of devices from the simulation

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
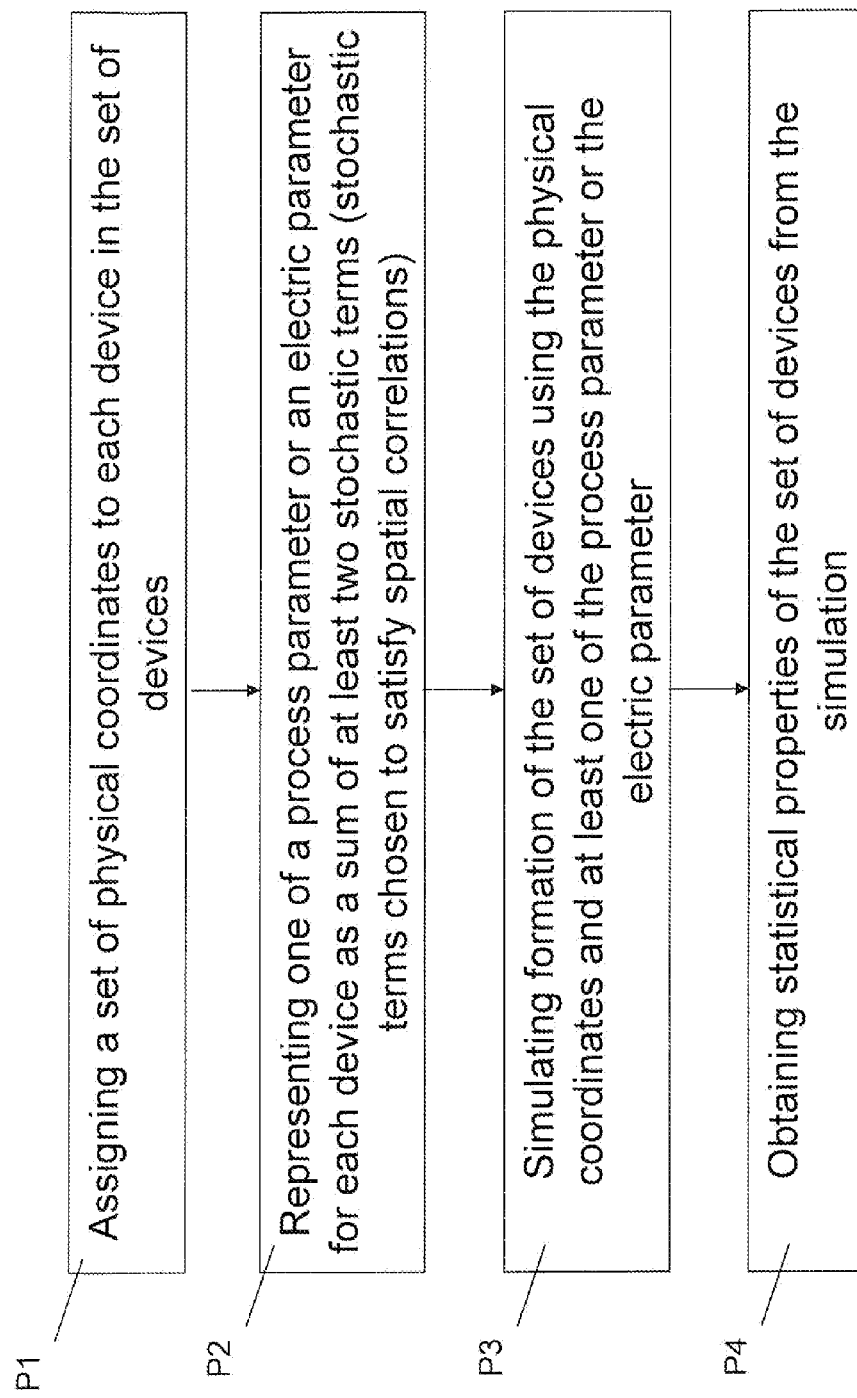
FIG. 1 shows flow diagram illustrating processes according to embodiments.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

Aspects disclosed herein relate to modeling devices, e.g., integrated circuit devices. More specifically, aspects disclosed herein relate to modeling spatial correlations among a set of devices using randomly generated spatial frequencies.

As integrated circuit (IC) process technology moves to progressively smaller technology nodes (e.g., down to 45 nanometer (nm), 32/28 nm, and 22/20 nm node technologies), variations in these processes become larger and larger. In semiconductor processes and devices, as well as in logic circuits, the intra-die variations and/or inter-die variations exhibit spatial correlations. Namely, measured hardware data has shown that there exist spatial correlations among multiple logic circuits, multiple semiconductor devices, or among the electric parameters of multiple devices located within a chip/die or located on different dies/chips in the same wafer. Additionally, the degree of the spatial correlation generally decreases with increasing separation between devices. As noted herein, these correlations can be difficult to model, particularly as the IC process technology progresses to smaller nodes.

Circuit design and circuit yield can be improved by using better and more accurate circuit and device models in circuit design and circuit simulations. Including spatial correlations in circuit and device models can improve the quality and accuracy of those models.

In contrast to conventional approaches, aspects of the invention disclosed provide a method of constructing a spatially correlated statistical model. The model describes the correlation among a set of device instances (or device parameter instances, or logic circuit instances). As described herein, the degree of correlation (i.e., the correlation coefficient) between any two devices decreases with increasing distance between the two devices. According to aspects described herein, the modeled spatial correlation is both translationally invariant and continuous.

A first aspect disclosed herein includes a computer-implemented method of modeling a spatial correlation among a set of devices (e.g., semiconductor devices). The method includes: assigning a set of physical coordinates to each device in the set of devices and representing one of a process parameter or an electric parameter for each device as a sum of at least two stochastic terms. In various embodiments, the at least two stochastic terms are chosen to satisfy the spatial correlations. The method can further include simulating formation of the set of devices using the physical coordinates and the at least one of the process parameter or the electric parameter. Additionally, after the simulating, the method can include obtaining statistical properties of the set of devices from the simulation.

Turning to FIG. 1, a flow diagram illustrating a computer-implemented method of modeling a spatial correlation among a set of semiconductor devices according to embodiments is shown. In some cases, the spatial correlation being modeled according to embodiments is an across-chip variation (ACV). As is known in the art, an across-chip variation can indicate a distinction between features of substantially identical devices (e.g., semiconductor devices such as chips) which are designed to be exactly identical. ACV can indicate an amount of variation (from a design) in the production of a group of devices.

As depicted in FIG. 1, the method of modeling these spatial correlations can include, in process P1, assigning a set of physical coordinates to each device in a set of devices (e.g., semiconductor or integrated circuit devices). It is understood that the set of devices can include a plurality of conventional integrated circuit devices on a wafer, chip or kerf. The devices could include transistors, resistors, lines, interconnects, or any other conventional integrated circuit devices. In any case, process P1 can include assigning a set of physical coordinates, such as x-coordinates and y-coordinates attributed to each device in the set of devices. It is understood that the "set" of devices can include any number of devices greater than one. That is, the process described herein can be applied to modeling spatial correlations between at least two devices within a particular space. It is further understood that the approaches described herein, while described with respect to the two-dimensional x-y plane, can further be applied to three-dimensional (x-y-z space) layouts.

In any case, according to embodiments, after assigning physical coordinates to each device in the set of devices (process P1), in process P2 the method can include representing either one of a process parameter or an electric parameter for each device (in the set) as a sum of at least two stochastic terms. As used herein, the term "process parameter" can include one or more of a space constraint, fabrication constraint, a thickness of a gate oxide (e.g., in a metal-on-semiconductor field-effect-transistor, or MOSFET), a channel length and/or channel width (e.g., of a MOSFET), a width of an interconnect wire, a thickness of an interconnect wire, etc. As used herein, the term "electric parameter" can include one or more of an electrical connection condition, e.g., condition to avoid short-circuiting, current leakage, such as a threshold voltage (e.g., in a MOSFET), a drain current (e.g., in a MOSFET), a resistance of a diffused resistor, a capacitance of a junction (e.g. a MOSFET junction), a capacitance of a metal-on-silicon capacitor/varactor, a capacitance of a metal-insulator-metal capacitor, an inductance of a spiral inductor, a delay of a ring oscillator, etc. According to embodiments, the process parameter or the electric parameter can be represented as a sum of at least two stochastic terms. In various embodiments, the stochastic terms are chosen to satisfy the spatial correlations between the devices. As used herein, the at least two stochastic terms can be functions of physical coordinates of the device. Specifically, each of at least two stochastic terms is a product of a random variable and a trigonometric function. In some cases, the argument of the trigonometric function is a product of a physical coordinate of the device and a randomly generated spatial frequency. As is known in the art, the "argument" of a function is the variable, term or expression on which the function operates, e.g., the argument of "sin(2A)" is "2A". In other cases, the argument of the trigonometric function is a sum of two terms, with each term being a product of a physical coordinate of the device and a randomly generated spatial frequency. As depicted further herein, a stochastic random spatial frequency can be represented in the equations as $(g_{n,3}/d_n)$.

In some cases, the distribution of a random spatial frequency is a Gaussian function, a Lorentz function or an exponential function. In some cases, the random variable is selected such that a mean value of the one of the process parameter or the electric parameter satisfies a predetermined mean value. This predetermined mean value can be dictated by the needs of a particular semiconductor technology, e.g., device type, implementation, environment, etc. Because the predetermined mean value applies to the set of devices, it is independent of the set of physical coordinates of the individual devices in the layout.

In some cases, the trigonometric function is selected such that a variance of the one of the process parameter or the electric parameter satisfies a predetermined variance value. In various embodiments, this predetermined variance value can be dictated by the needs of a particular semiconductor technology, e.g., device type, implementation, environment, etc. Additionally, the predetermined variance value is independent of the set of physical coordinates of the device. In some embodiments, the trigonometric function is a sine function or a cosine function, which initially creates a variance of the process parameter or the electric parameter. The trigonometric function can be further selected such that a first correlation between the one of the process parameter or the electric parameter for a first device and a second correlation between the one of the process parameter or the electric parameter for a second device depends only on at least one of the following: a difference between corresponding x coordinates of the first device and the second device, or a difference between corresponding y coordinates of the first device and the second device.

Following process P2, the method may proceed to process P3, which can include simulating formation of the set of devices using the physical coordinates and at least one of the process parameter or the electric parameter.

Following simulation in process P3, the process can further include obtaining in process P4, statistical properties of the set of devices from the simulation. The statistical properties can be used to determine spatial correlations between the devices (e.g., in a layout).

These process (P1-P4) can be performed across a plurality of devices on a given wafer, kerf, etc., and can be iterated when desirable to determine spatial correlations between devices. Additional details about the processes P1-P3 can be found in the example mathematical flow described herein and referenced in FIGS. 2-4.

Example Mathematical Flow

For modeling one-dimensional spatial correlations C among process parameters $P_1, P_2, \ldots, P_N$ of at least two devices (N≥2) in a set of semiconductor devices, process parameters $P_1, P_2, \ldots, P_N$ are expressed as follows $$P_i(x_i) = \mu_i + \sigma_{cm,i} G_0 + \sigma_{acv,i} \sum_{n=1}^{M} a_n \left( g_{n,1} \cos \frac{g_{n,3} x_i}{d_n} + g_{n,2} \sin \frac{g_{n,3} x_i}{d_n} \right) + \frac{1}{\sqrt{2}} g_i \sigma_{m0,i}, \quad \text{Equation (1)}$$

where each of $G_0, g_{n,1}, g_{n,2}$ (n=1, 2, ..., M), and $g_i$ (i=1, 2, ..., N) is an independent random variable (of mean zero and standard deviation one). In this case, in contrast to conventional approaches, each of $g_{n,3}$ (n=1, 2, ..., M) is also an independent random variable.

In addition, $x_i$ is the coordinate of the $i^{th}$ device, $\mu_i$ is the mean value of $P_i$, $$\langle P_i(x_i) \rangle = \mu_i, \, i=1, 2, 3, \ldots, N;$$

$\sigma_{cm,i}$ is the chip mean part of standard deviation, $\sigma_{acv,i}$ is the across-chip part of standard deviation, and $\sigma_{m0,i}$ is the mismatch part of standard deviation. The variance of $P_i$ is obtained from Eq. (1) as $$\langle [P_i(x_i) - \langle P_i(x_i) \rangle]^2 \rangle = \sigma_{cm,i}^2 + \sigma_{acv,i}^2 + \frac{1}{2}\sigma_{m0}^2 \equiv \sigma_i^2,$$

$$i = 1, 2, 3, \ldots, N;$$

A correlation coefficient C between $P_i$ and $P_j$ is found from Eq. (1) to be:

$$c_{ij}(x_i, x_j) \equiv \frac{\langle [P_i(x_i) - P_j(x_j)]^2 \rangle}{\sigma_i \sigma_j}$$

$$= \frac{\sigma_{cm,i} \sigma_{cm,j} + \sigma_{acv,i} \sigma_{acv,j} c_{acv,x}(x_{ij})}{\sigma_i \sigma_j}$$

$$i, j = 1, 2, 3, \ldots, N, i \neq j,$$

with $$c_{acv,x}(x_{ij}) = \sum_{n=1}^{M} a_n^2 h\left(\frac{x_{ij}}{d_n}\right), \quad \text{Eq. (2)}$$

$$i, j = 1, 2, 3, \ldots, N, i \neq j,$$

and $$h(u) = \langle \cos(g_{n,3} u) \rangle. \quad \text{Eq. (3)}$$

where $x_{ij} = x_i - x_j$.

The function $h(u)$ has a property, $h(0)=1$. The sum of the square of coefficients $a_1, a_2, \ldots, a_n$ is normalized, $$\sum_{n=1}^{M} a_n^2 = 1.$$

In different embodiments, as described herein, the distribution of a randomly generated spatial correlation includes at least one of a Gaussian function, a Lorentz function or an exponential function. Each of these functions is described further herein.

Example Gaussian Type of One-Dimensional Spatial Correlation:

In a first case, each of $g_{n,3}$ (n=1, 2, ..., M) is a random spatial frequency with a Gaussian distributions (of a mean zero and a standard deviation 1). Using this Gaussian type of random spatial frequency $g_{n,3}$ in Equation (3), it is possible to obtain a Gaussian type of spatial correlation, $$h(u) = \exp(-u^2/2),$$

which decreases monotonically with increasing $|u|$, is always positive, and is practically zero (~0.01 or smaller) when $|u|$ is larger than 3. Substituting this $h(u)$ into Eq. (2), one determines a spatial correlation as a sum of multiple Gaussian distributions, $$c_{acv,x}(x_{ij}) = \sum_{n=1}^{M} a_n^2 \exp\left(-\frac{x_{ij}^2}{2d_n^2}\right), \, i, j = 1, 2, 3, \ldots, N, i \neq j.$$

Figure 2:
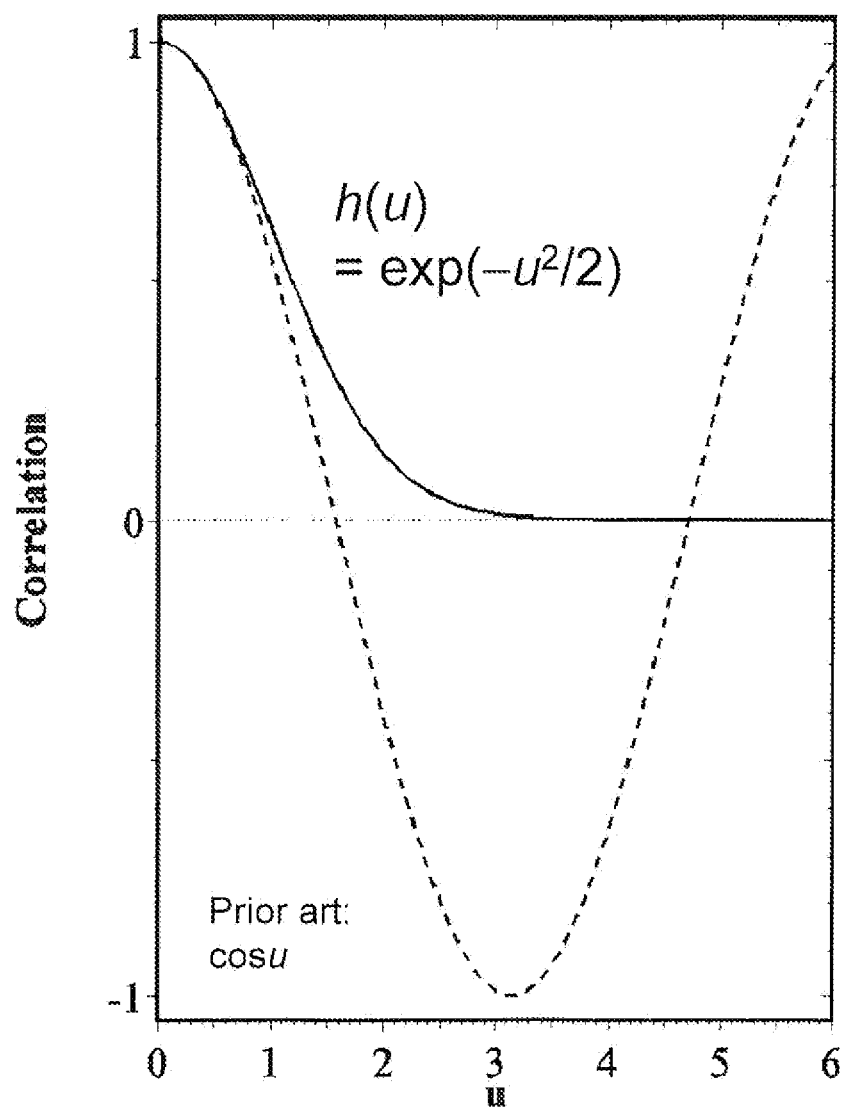
FIG. 2 shows an example spatial correlation graph according to embodiments.

The case of M=1 can yield an exact Gaussian type of spatial correlation. The solid curve in FIG. 2 illustrates a Gaussian type of spatial correlation ($u = x_{ij}/d_1$). In contrast to the conventional scenario, where the spatial frequency is a fixed value (with a spatial correlation in the form of cos(u), depicted by the dashed curve in FIG. 2), the solid curve in FIG. 2 shows a distinct correlation—a decrease monotonically with increasing device separation $|x_{ij}|$, is always positive, and is practically zero (~0.01 or smaller) when the device separation $|x_{ij}|$ is larger than $3d_1$.

Figure 3:
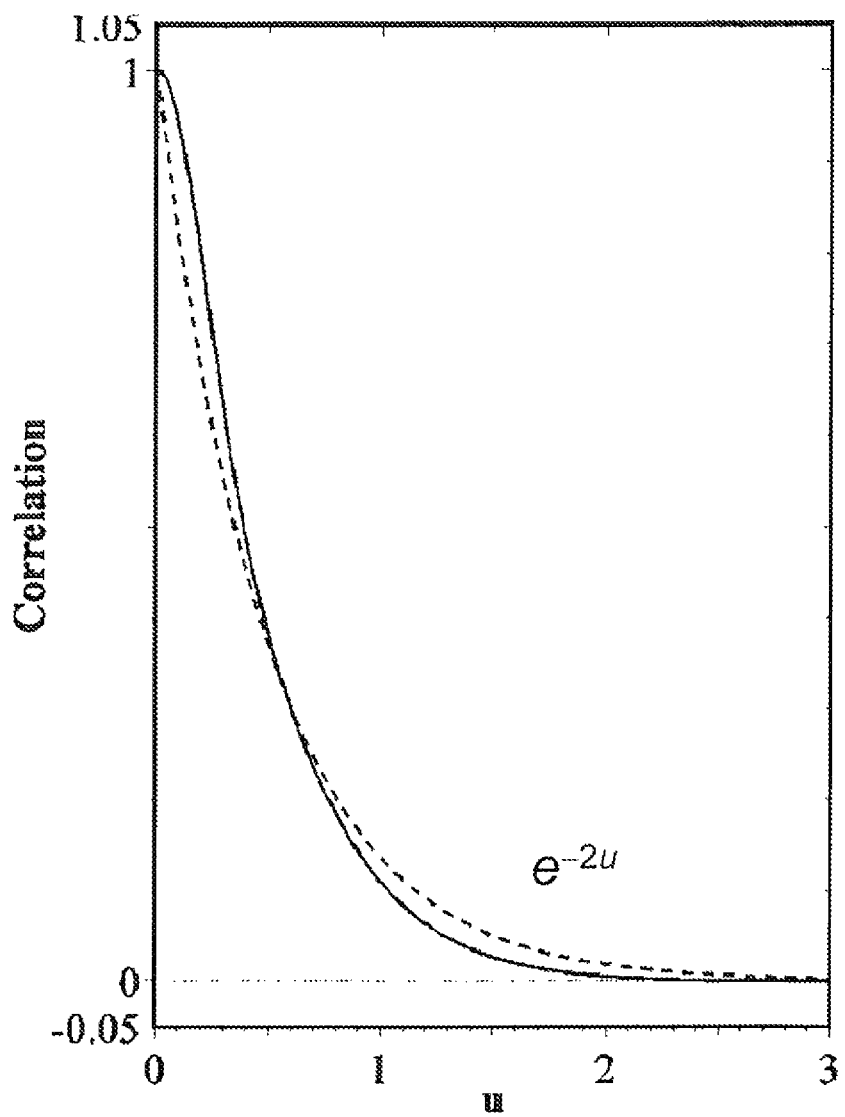
FIG. 3 shows an example spatial correlation graph according to embodiments.
Figure 4:
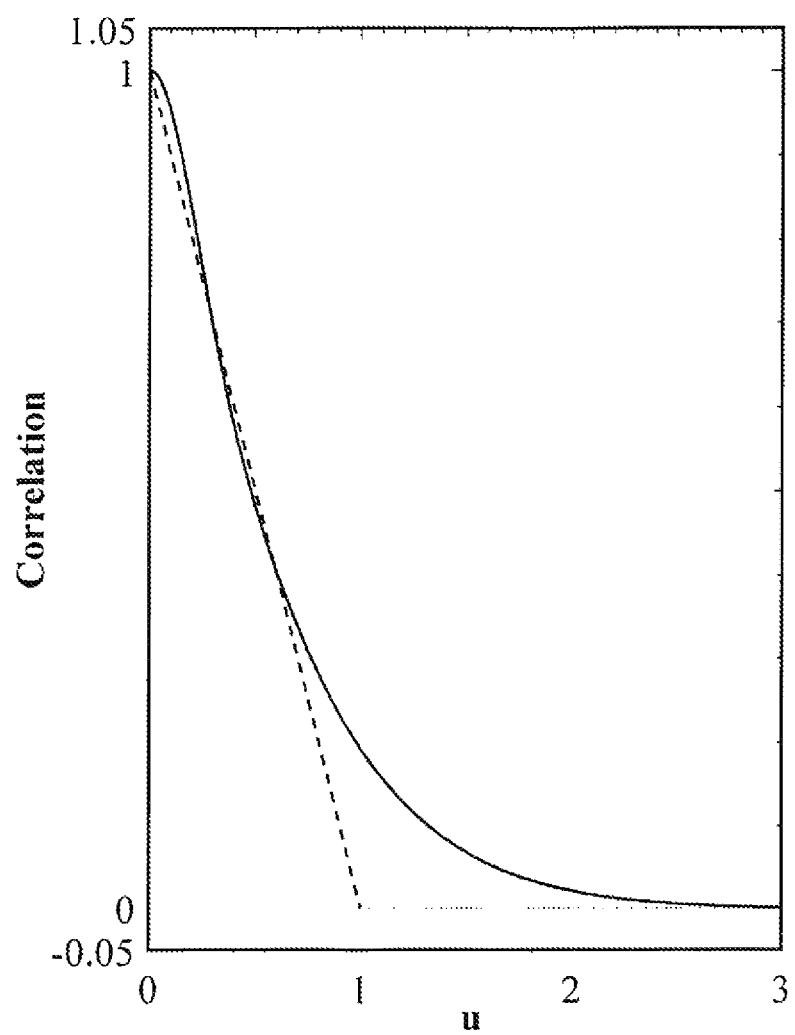
FIG. 4 shows an example spatial correlation graph according to embodiments.

Many conventional SPICE (Simulated Program with Integrated Circuit Emphasis) simulators provide only uniform-type random variables and Gaussian-type of random variables. In FIGS. 3 and 4, use of multiple Gaussian-type spatial frequencies to mimic a given spatial correlation is illustrated.

FIG. 3 shows an attempt to mimic an exponential type of spatial correlation using the sum of 4 Gaussian-type spatial frequencies. The weights and ranges of Gaussian distributions are listed as follows:

M=4: $a_1^2=0.4$, $d_1=0.2$; $a_2^2=0.3$, $d_2=0.4$; $a_3^2=0.2$, $d_3=0.6$; $a_4^2=0.1$, $d_4=0.8$.

FIG. 4 shows an attempt to mimic a linear decay type of spatial correlation, using the sum of 100 Gaussian-type spatial frequencies. In this case, the weights and ranges of Gaussian type of distributions are as follows:

M=100: $a_n^2=1/M$, and $d_n=n/M$.

Example Lorentz type of one-dimensional spatial correlation:

In this second case, each of $g_{n,3}$ (n=1, 2, ..., M) is a random spatial frequency with an exponential type of distribution (of a mean zero and a standard deviation 1). Using the exponential type of random spatial frequency $g_{n,3}$ in Equations (3), it is possible to obtain a Lorentz type of spatial correlation as follows, $$h(u) = \frac{2}{2 + u^2},$$

which is always positive and decreases monotonically towards zero with increasing $|u|$. Substituting this $h(u)$ into Eq. (2), one obtains a spatial correlation C of a form of a sum of multiple Lorentz distributions, $$c_{acv,x}(x_{ij}) = \sum_{n=1}^{M} \frac{2a_n^2 d_n^2}{x_{ij}^2 + 2d_n^2}, \; i, j = 1, 2, 3, \ldots, N, i \neq j,$$

which is always positive and decreases monotonically towards zero with increasing device separation $|x_{ij}|$.

Example Exponential Decay Type of One-Dimensional Spatial Correlation.

In this third case, each of $g_{n,3}$ (r=1, 2, ..., M) is a random spatial frequency with a Lorentz type of distributions (of a mean zero). Using the Lorentz type of random spatial frequency $g_{n,3}$ in Equations (3), it is possible to obtain an exponential type of spatial correlation C as follows, $$h(u) = \exp(-|u|),$$

which decreases monotonically with increasing $|u|$, is always positive, and is practically zero (~0.01 or smaller) when $|u|$ is larger than 4.5. Substituting the above h(u) into Eq. (2), one arrives at a spatial correlation of a form of a sum of multiple exponential distributions, $$c_{acv,x}(x_{ij}) = \sum_{n=1}^{M} a_n^2 \exp\left(-\frac{|x_{ij}^2|}{2d_n^2}\right), \; i, j = 1, 2, 3, \ldots, N, i \neq j,$$

which decreases monotonically with increasing device separation $|x_{ij}|$ and its value is always positive.

Isotropic Two-Dimensional Spatial Correlation

In the isotropic situation, the two-dimensional spatial correlations C (including isotropic Gaussian types) are characterized according to the following equation:

$$C_{ij}(x_i, x_j) = \frac{1}{\sigma_i \sigma_j} \left[\sigma_{cm,i}\sigma_{cm,j} + \sigma_{acv,i}\sigma_{acv,j} \sum_{n=1}^{M} a_n^2 \exp\left(-\frac{x_{ij}^2 + y_{ij}^2}{2d_n^2}\right)\right],$$

$i, j = 1, 2, 3, \ldots, N, i \neq j.$

The above type of spatial correlation can be modeled using the following expression for $P_i$:

$$P_i(x_i) = \mu_i + \sigma_{cm,i} G_0 + \frac{1}{\sqrt{2}} g_i \sigma_{m0,i} +$$

$$\sigma_{acv,i} \sum_{n=1}^{M} a_n \left[g_{n,1} \cos\left(\frac{g_{n,3} x_i}{d_n} + \frac{g_{n,4} y_i}{s_n}\right) + g_{n,2} \sin\left(\frac{g_{n,3} x_i}{d_n} + \frac{g_{n,4} y_i}{s_n}\right)\right],$$

$i = 1, 2, 3, \ldots, N,$ where each of $g_{n,3}$ and $g_{n,4}$ (n=1, 2, ..., M) is a stochastic (i.e., randomly generated) spatial frequency with a Gaussian distribution, and the argument of each trigonometric function is a sum of two terms with each term being a product of a physical coordinate of the device and a random spatial frequency.

Example of Separable Two-Dimensional Spatial Correlation

In this case, the two-dimensional spatial correlations C are characterized as follows:

$$C_{ij}(x_i, x_j) = \frac{\sigma_{cm,i}\sigma_{cm,j} + \sigma_{acv,i}\sigma_{acv,j} c_{acv,x}(x_{ij}) c_{acv,y}(y_{ij})}{\sigma_i \sigma_j},$$

$i, j = 1, 2, 3, \ldots, N, i \neq j.$

This type of spatial correlation can be modeled using the following expression for $P_i(x_i)$:

$$P_i(x_i) = \mu_i + \sigma_{cm,i} G_0 + \frac{1}{\sqrt{2}} g_i \sigma_{m0,i} + \sigma_{acv,i}$$

$$\left[\sum_{n=1}^{M} a_n \left(g_{n,1} \cos\frac{g_{n,3} x_i}{d_n} + g_{n,2} \sin\frac{g_{n,3} x_i}{d_n}\right)\right]$$

$$\left[\sum_{k=1}^{K} b_k \left(g_{k,4} \cos\frac{g_{k,6} y_i}{s_k} + g_{k,5} \sin\frac{g_{k,6} y_i}{s_k}\right)\right],$$

$i = 1, 2, 3, \ldots, N.$

The corresponding spatial correlation C can be derived as:

$$C_{ij}(x_i, x_j) = \frac{1}{\sigma_i \sigma_j} \left\{\sigma_{cm,i}\sigma_{cm,j} + \sigma_{acv,i}\sigma_{acv,j} \left[\sum_{n=1}^{M} a_n^2 h\left(\frac{x_{ij}}{d_n}\right)\right]\left[\sum_{k=1}^{K} b_k^2 h\left(\frac{y_{ij}}{s_k}\right)\right]\right\},$$

$i, j = 1, 2, 3, \ldots, N, i \neq j,$ with $$\sum_{n=1}^{M} a_n^2 = 1 \text{ and } \sum_{k=1}^{K} b_k^2 = 1.$$

The form of the function h(u) can be $$h(u) = \exp\left(-\frac{1}{2}u^2\right), \; h(u) = \frac{2}{2+u^2}, \; h(u) = \frac{2}{2+u^2}, \text{ etc.}$$

Examples of General Two-Dimensional Spatial Correlation

Further, to model other two-dimensional, non-isotropic, non-separable spatial correlations, the following expression for a process parameter P can be utilized:

$$P_i(x_i) = \mu_i + \sigma_{cm,i} G_0 + \frac{1}{\sqrt{2}} g_i \sigma_{m0,i} + \sigma_{acv,i} \sum_{n=1}^{M} \sum_{k=1}^{K} A_{nk}$$

$$\left(g_{n1,k1} \cos\frac{g_{n3} x_i}{d_n} \cos\frac{g_{k6} y_i}{s_k} + g_{n1,k2} \cos\frac{g_{n3} x_i}{d_n} \sin\frac{g_{k6} y_i}{s_k} + \right.$$

$$\left. g_{n2,k1} \sin\frac{g_{n3} x_i}{d_n} \cos\frac{g_{k6} y_i}{s_k} + g_{n2,k2} \sin\frac{g_{n3} x_i}{d_n} \sin\frac{g_{k6} y_i}{s_k}\right),$$

$i = 1, 2, 3, \ldots, N.$

Where the corresponding spatial correlation C is found as:

$$C_{ij}(x_i, x_j) = \frac{1}{\sigma_i \sigma_j} \left[\sigma_{cm,i}\sigma_{cm,j} + \sigma_{acv,i}\sigma_{acv,j} \sum_{n=1}^{M} \sum_{k=1}^{K} A_{nk}^2 h\left(\frac{x_{ij}}{d_n}\right) h\left(\frac{y_{ij}}{s_k}\right)\right],$$

$i, j = 1, 2, 3, \ldots, N, i \neq j,$ with $$\sum_{n=1}^{M}\sum_{k=1}^{K} A_{nk}^2 = 1.$$

Between a same type of object (with common parameters, devices, circuits and/or gates) at different locations, device mismatch (e.g., the resistance of two resistors, current of two capacitors or current of two transistors, etc.) can be related to the device correlation according to the following equation:

$$\left\langle [P_i(x_i) - P_j(x_j)]^2 \right\rangle_{N,\,i \neq j} = 2\sigma^2[1 - C_{ij}(x_i, x_j)],\ i,j = 1, 2, 3, \ldots,$$

Figure 5:
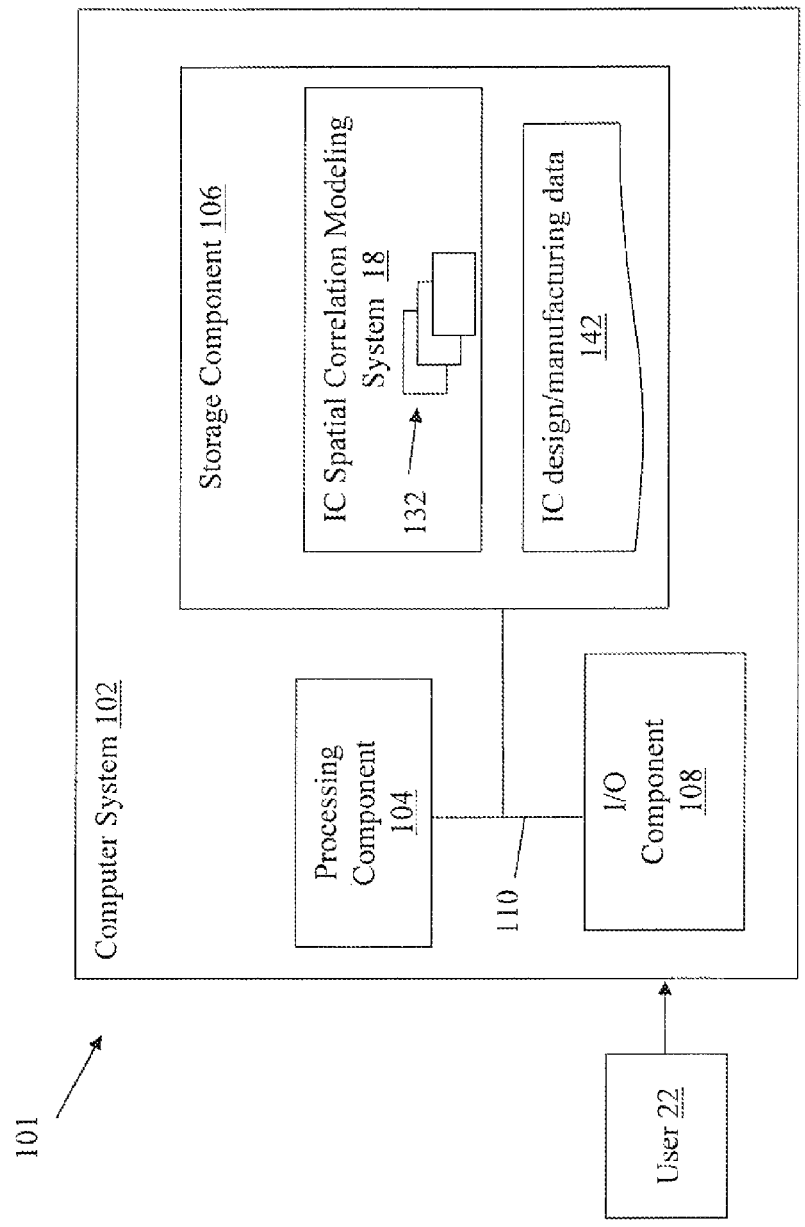
FIG. 5 shows an illustrative environment including an integrated circuit/semiconductor spatial correlation modeling system according to embodiments.

FIG. 5 depicts an illustrative environment 101 for modeling spatial correlations in integrated circuits (semiconductors) according to embodiments. To this extent, the environment 101 includes a computer system 102 that can perform a process described herein in order to model spatial correlations between integrated circuit (or semiconductor) devices across a plurality of chips, wafers, etc. In particular, the computer system 102 is shown as including an IC spatial correlation modeling system 18, which makes computer system 102 operable to model spatial correlations between integrated circuit (or semiconductor) devices across a plurality of chips, wafers, etc. by performing any/all of the processes described herein and implementing any/all of the embodiments described herein.

The computer system 102 is shown including a processing component 104 (e.g., one or more processors), a storage component 106 (e.g., a storage hierarchy), an input/output (I/O) component 108 (e.g., one or more I/O interfaces and/or devices), and a communications pathway 110. In general, the processing component 104 executes program code, such as the IC spatial correlation modeling system 18, which is at least partially fixed in the storage component 106. While executing program code, the processing component 104 can process data, which can result in reading and/or writing transformed data from/to the storage component 106 and/or the I/O component 108 for further processing. The pathway 110 provides a communications link between each of the components in the computer system 102. The I/O component 108 can comprise one or more human I/O devices, which enable a human user 112 to interact with the computer system 102 and/or one or more communications devices to enable a system user 112 to communicate with the computer system 102 using any type of communications link. To this extent, the IC spatial correlation modeling system 18 can manage a set of interfaces (e.g., graphical user interface(s), application program interface, etc.) that enable human and/or system users 112 to interact with the IC spatial correlation modeling system 18. Further, the IC spatial correlation modeling system 18 can manage (e.g., store, retrieve, create, manipulate, organize, present, etc.) data, such as design data (including mask-level data, task data, prioritization data, etc.) using any solution.

In any event, the computer system 102 can comprise one or more general purpose computing articles of manufacture (e.g., computing devices) capable of executing program code, such as the IC spatial correlation modeling system 18, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the IC spatial correlation modeling system 18 can be embodied as any combination of system software and/or application software.

Further, the IC spatial correlation modeling system 18 can be implemented using a set of modules 132. In this case, a module 132 can enable the computer system 102 to perform a set of tasks used by the IC spatial correlation modeling system 18, and can be separately developed and/or implemented apart from other portions of the IC spatial correlation modeling system 18. As used herein, the term "component" means any configuration of hardware, with or without software, which implements the functionality described in conjunction therewith using any solution, while the term "module" means program code that enables the computer system 102 to implement the functionality described in conjunction therewith using any solution. When fixed in a storage component 106 of a computer system 102 that includes a processing component 104, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computer system 102.

When the computer system 102 comprises multiple computing devices, each computing device may have only a portion of IC spatial correlation modeling system 18 fixed thereon (e.g., one or more modules 132). However, it is understood that the computer system 102 and IC spatial correlation modeling system 18 are only representative of various possible equivalent computer systems that may perform a process described herein. To this extent, in other embodiments, the functionality provided by the computer system 102 and IC spatial correlation modeling system 18 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 102 includes multiple computing devices, the computing devices can communicate over any type of communications link. Further, while performing a process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

The computer system 102 can obtain or provide data, such as integrated circuit (IC) design data 142 using any solution. For example, the computer system 102 can generate and/or be used to IC design/manufacturing data 142, retrieve IC design/manufacturing data 142, from one or more data stores, receive IC design/manufacturing data 142, from another system, send IC design/manufacturing data 142 to another system, etc. As noted herein, IC design/manufacturing data 142 can include data such as mask-level data outlining parameters associated with distinct mask levels of an integrated circuit. Additionally, IC design/manufacturing data 142 can include task-based data (such as tasks entered by users 22), as well as layout data.

While shown and described herein as a method and system for prioritizing processes in the manufacture of integrated circuits, it is understood that aspects of the invention further provide various alternative embodiments. For example, in one embodiment, the invention provides a computer program fixed in at least one computer-readable medium, which when executed, enables a computer system to prioritize processes in the manufacture of integrated circuits. To this extent, the computer-readable medium includes program code, such as the IC spatial correlation modeling system 18 (FIG. 5), which implements some or all of the processes and/or embodiments described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; etc.

In another embodiment, the invention provides a method of providing a copy of program code, such as the IC spatial correlation modeling system 18 (FIG. 5), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for prioritizing processes in forming an integrated circuit. In this case, a computer system, such as the computer system 102 (FIG. 5), can be obtained (e.g., created, maintained, made available, etc.) and one or more components for performing a process described herein can be obtained (e.g., created, purchased, used, modified, etc.) and deployed to the computer system.

To this extent, the deployment can comprise one or more of: (1) installing program code on a computing device; (2) adding one or more computing and/or I/O devices to the computer system; (3) incorporating and/or modifying the computer system to enable it to perform a process described herein; etc.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method of modeling spatial correlations among a set of devices, the method comprising:
   assigning a set of physical coordinates to each device in the set of devices;
   representing one of a process parameter or an electric parameter for each device as a sum of at least two stochastic terms,
   wherein the at least two stochastic terms are chosen to satisfy the spatial correlations,
   wherein each of at least two stochastic terms is a product of a random variable and at least one trigonometric function;
   simulating formation of the set of devices using the physical coordinates and the at least one of the process parameter or the electric parameter; and
   obtaining statistical properties of the set of devices from the simulation.

2. The computer-implemented method of claim 1, wherein the set of devices includes at least one of a set of semiconductor devices, a set of logic gates, or a set of integrated circuits.

3. The computer-implemented method of claim 1, wherein the spatial correlations include an across-chip variation.

4. The computer-implemented method of claim 1, wherein the set of physical coordinates include x-coordinates and y-coordinates attributed to each device in the set of devices.

5. The computer-implemented method of claim 1, wherein the random variable is selected such that a mean value of each of the process parameter or the electric parameter satisfies a predetermined mean value and is independent of the set of physical coordinates of the device.

6. The computer-implemented method of claim 1, wherein the argument of at least one trigonometric function includes either a product of a physical coordinate of the device and a randomly generated spatial frequency, or a sum of products of physical coordinates of the device and randomly generated spatial frequencies.

7. The computer-implemented method of claim 1, wherein a spatial frequency is a stochastic variable and has a distribution chosen to satisfy predetermined spatial correlations among the set of devices.

8. The computer-implemented method of claim 1, wherein the distribution of a randomly generated spatial frequency can be one of following types: a Gaussian function, Lorentz function, or an exponential function.

9. The computer-implemented method of claim 1, wherein the trigonometric function is selected such that a first correlation between the one of the process parameter or the electric parameter for a first device and a second correlation between the one of the process parameter or the electric parameter for a second device depends only on at least one of: a difference between corresponding x coordinates of the first device and the second device, or a difference between corresponding y coordinates of the first device and the second device.

10. The computer-implemented method of claim 1, wherein the spatial correlations among the set of devices includes spatial correlations among process parameters in the set of devices, wherein the set of devices includes at least two devices, and wherein the spatial correlations include one-dimensional spatial correlations among the process parameters, wherein the process parameters $P_1$, $P^2$,..., $P_N$ are expressed as:

$$P_i(x_i) = \mu_i + \sigma_{cm,i} G_0 + \sigma_{acv,i} \sum_{n=1}^{M} a_n \left( g_{n,1} \cos \frac{g_{n,3} x_i}{d_n} + g_{n,2} \sin \frac{g_{n,3} x_i}{d_n} \right) + \frac{1}{\sqrt{2}} g_i \sigma_{m0,i},$$

$$i = 1, , 3, \ldots, N,$$

wherein each of $G_0$, $g_{n,1}$, $g_{n,2}$ (n =1, 2, ..., M), and $g_i$ (i =1, 2, ..., N) is an independent random variable having a mean of zero and a standard deviation of one, and $g_{n,3}$ is an independent random variable, wherein $x_i$ is the coordinate of the $i^{th}$ device, and $\mu_i$ is the mean value of $P_i$.(i=1, 2, 3, ..., N), and wherein $\sigma_{cm,i}$ is the chip mean part of standard deviation, $\sigma_{acv,i}$ is the across-chip part of standard deviation, and $\sigma_{m0,i}$ is the mismatch part of standard deviation.

11. A system comprising:

at least one computing device having at least one of a processing component or a storage component, the at least one computing device configured to model spatial correlations among a set of devices by performing the following:

assigning a set of physical coordinates to each device in the set of devices;

representing one of a process parameter or an electric parameter for each device as a sum of at least two stochastic terms, wherein the at least two stochastic terms are chosen to satisfy the spatial correlations, wherein each of at least two stochastic terms is a product of a random variable and at least one trigonometric function;

simulating formation of the set of devices using the physical coordinates and the at least one of the process parameter or the electric parameter; and obtaining statistical properties of the set of devices from the simulation.

12. The system of claim 11, wherein the spatial correlations include an across-chip variation.

13. The system of claim 11, wherein the random variable is selected such that a mean value of each of the process parameter or the electric parameter satisfies a predetermined mean value and is independent of the set of physical coordinates of the device.

14. The system of claim 11, wherein the argument of at least one trigonometric function includes either a product of a physical coordinate of the device and a randomly generated spatial frequency, or a sum of products of physical coordinates of the device and randomly generated spatial frequencies.

15. The system of claim 11, wherein the trigonometric function is selected such that a first correlation between the one of the process parameter or the electric parameter for a first device and a second correlation between the one of the process parameter or the electric parameter for a second device depends only on at least one of: a difference between corresponding x coordinates of the first device and the second device, or a difference between corresponding y coordinates of the first device and the second device.

16. The system of claim 11, wherein the spatial correlations among the set of devices includes spatial correlations among process parameters in the set of devices, wherein the set of devices includes at least two devices, and wherein the spatial correlations include one-dimensional spatial correlations among the process parameters, wherein the process parameters $P_1$, $P^2$, ..., $P_N$ are expressed as:

$$P_i(x_i) = \mu_i + \sigma_{cm,i} G_0 + \sigma_{acv,i} \sum_{n=1}^{M} a_n \left( g_{n,1} \cos \frac{g_{n,3} x_i}{d_n} + g_{n,2} \sin \frac{g_{n,3} x_i}{d_n} \right) + \frac{1}{\sqrt{2}} g_i \sigma_{m0,i},$$

$$i = 1, , 3, \ldots, N,$$

wherein each of $G_0$, $g_{n,1}$, $g_{n,2}$ (n=1, 2, ..., M), and $g_i$ (i=1, 2, ..., N) is an independent random variable having a mean of zero and a standard deviation of one, and $g_{n,3}$ is an independent random variable, wherein $x_i$, is the coordinate of the $i^{th}$ device, and $\mu_i$ is the mean value of $P_i$.(i=1, 2, 3, ..., N), and wherein $\sigma_{cm,i}$ is the chip mean part of standard deviation, $\sigma_{acv,i}$ is the across-chip part of standard deviation, and $\sigma_{m0,i}$ is the mismatch part of standard deviation.

17. A computer program comprising program code embodied in at least one non-transitory computer-readable medium, which when executed, enables a computer system to model spatial correlations among process parameters in a set of at least two devices, the method comprising:

assigning a set of physical coordinates to each device in the set of devices;

representing one of a process parameter or an electric parameter for each device as a sum of at least two stochastic terms, wherein the at least two stochastic terms are chosen to satisfy the spatial correlations among the process parameters;

simulating formation of the set of devices using the physical coordinates and the at least one of the process parameter or the electric parameter; and obtaining statistical properties of the set of devices from the simulation, wherein the spatial correlations include one-dimensional spatial correlations among the process parameters, wherein the process parameters $P_1$, $P_2$, ..., $P_N$ are expressed as:

$$P_i(x_i) = \mu_i + \sigma_{cm,i} G_0 + \sigma_{acv,i} \sum_{n=1}^{M} a_n \left( g_{n,1} \cos \frac{g_{n,3} x_i}{d_n} + g_{n,2} \sin \frac{g_{n,3} x_i}{d_n} \right) + \frac{1}{\sqrt{2}} g_i \sigma_{m0,i},$$

$$i = 1, , 3, \ldots, N,$$

wherein each of $G_0$, $g_{n,1}$, $g_{n,2}$ (n=1, 2, ..., M), and $g_i$ (i=1, 2, ..., N) is an independent random variable having a mean of zero and a standard deviation of one, and $g_{n,3}$ is an independent random variable, wherein $x_I$ is the coordinate of the $i^{th}$ device, and $\mu_i$ is the mean value of $P_i$ (i=1, 2, 3, ..., N), and wherein $\sigma_{cm,i}$ is the chip mean part of standard deviation, $\sigma_{acv,i}$ is the across-chip part of standard deviation, and $\sigma_{m0,i}$ is the mismatch part of standard deviation.

18. The computer program of claim 17, wherein a set of devices includes at least one of a set of semiconductor devices, a set of logic gates, or a set of integrated circuits.

19. The computer program of claim 17, wherein the spatial correlations include an across-chip variation.

20. The computer program of claim 17, wherein the distribution of a randomly generated spatial frequency can be one of following types: a Gaussian function, Lorentz function, or an exponential function.

* * * * *